United States Patent
Yi et al.

(10) Patent No.: US 11,119,688 B2
(45) Date of Patent: Sep. 14, 2021

(54) REPLICA PROCESSING METHOD AND NODE, STORAGE SYSTEM, SERVER, AND READABLE MEDIUM

(71) Applicant: BEIJING BAIDU NETCOM SCIENCE AND TECHNOLOGY CO., LTD., Beijing (CN)

(72) Inventors: Zhengli Yi, Beijing (CN); Pengfei Zheng, Beijing (CN); Xinxing Wang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/852,746

(22) Filed: Apr. 20, 2020

(65) Prior Publication Data
US 2020/0348849 A1 Nov. 5, 2020

(30) Foreign Application Priority Data
Apr. 30, 2019 (CN) .......................... 201910363193.X

(51) Int. Cl.
*G06F 12/00* (2006.01)
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ........ G06F 3/065; G06F 3/0619; G06F 3/067; G06F 3/0608; G06F 3/0652
See application file for complete search history.

(56) References Cited

U.S. PATENT DOCUMENTS

2018/0150230 A1* 5/2018 Schreter ................. G06F 11/16
2020/0117372 A1* 4/2020 Corey ..................... G06F 3/067

FOREIGN PATENT DOCUMENTS

| JP | 2001318921 A | 11/2001 |
| JP | 2005157165 A | 6/2005 |
| KR | 20180021679 A | 3/2018 |

OTHER PUBLICATIONS

Office Action for Korean Application No. 10-2020-0016815, dated Feb. 3, 2021, 8 pages.

* cited by examiner

*Primary Examiner* — Jason W Blust
(74) *Attorney, Agent, or Firm* — Fay Sharpe LLP

(57) ABSTRACT

The present disclosure provides a replica processing method based on a raft protocol. The method includes: for a node to be processed corresponding to a raft replica group, determining a replica to be cleaned corresponding to the node, the raft replica group including a first node and at least one second node; for the node, obtaining replica configuration information of the raft replica group, the replica configuration information including one or more primary replicas stored by the first node and one or more secondary replicas stored by the at least one second node; and for the node, determining whether the replica configuration information includes the replica to be cleaned, if yes, reserving the replica to be cleaned, and if no, deleting the replica to be cleaned. The present disclosure also provides a replica processing node, a distributed storage system, a server, and a computer-readable medium.

14 Claims, 5 Drawing Sheets

11

11A — for the node to be processed corresponding to the raft replica group, the replica processing node is configured to send a request for acquiring a first replica list of the node to be processed to a master

11B — for the node to be processed corresponding to the raft replica group, the replica processing node is configured to receive the first replica list sent back by the master based on the request for acquiring the first replica list of the node to be processed

11C — for the node to be processed corresponding to the raft replica group, the replica processing node determines the replica to be cleaned corresponding to the node to be processed according to replicas in a second replica list stored in the node to be processed and replicas in the first replica list

12A — for the node to be processed corresponding to the raft replica group, the replica processing node sends a request for acquiring replica configuration information to the first node in the raft replica group, according to the determined replica to be cleaned corresponding to the node to be processed

12B — for the node to be processed corresponding to the raft replica group, the replica processing node receives the replica configuration information sent back by the first node in the raft replica group corresponding to the node to be processed based on the request for acquiring replica configuration information

FIG. 3

REPLICA PROCESSING METHOD AND NODE, STORAGE SYSTEM, SERVER, AND READABLE MEDIUM

CROSS-REFERENCE TO RELATED APPLICATION

This application claims priority to and benefits of Chinese Patent Application Serial No. 201910363193.X filed with the State Intellectual Property Office of P. R. China on Apr. 30, 2019, the entire content of which is incorporated herein by reference.

TECHNICAL FIELD

The present disclosure relates to a communication field, and more particularly, to a replica processing method based on a raft protocol, a replica processing node, a distributed storage system, a server, and a computer readable medium.

BACKGROUND

Garbage cleaning is an important content in the design of distributed block storage systems. Generally, with traditional methods of garbage cleaning, data storage node (blockServer) inquiries a metadata server (master) of the replicas that are stored thereon, and then replicas stored in the blockserver and absent in the master are wiped out according to replica information. However, there are some problems with this simple method of trusting the master, for example, inevitably, there may be bugs on software of the master, a disk of the master may fail, or metadata on the master may be damaged. These conditions may cause errors on replica metadata of the master, such that the replica metadata stored on the master may be inconsistent with the replica information on the blockServer, which causes the blockserver to delete local replica data wrongfully. If the number of remaining replicas in the raft replica group to which the data storage node belongs is less than half of the total number of replicas, unavailability of the raft replica group or even data loss may be inevitable.

SUMMARY

Embodiments of the present disclosure provide a replica processing method based on a raft protocol, a replica processing node, a distributed storage system, a server, and a computer readable medium.

In a first aspect, embodiments of the present disclosure provide a replica processing method based on a raft protocol. The method includes: for a node to be processed corresponding to a raft replica group, determining a replica to be cleaned corresponding to the node to be processed, in which the raft replica group includes a first node for storing one or more primary replicas and at least one second node for storing one or more secondary replicas; for the node to be processed corresponding to the raft replica group, obtaining replica configuration information of the raft replica group corresponding to the node to be processed, in which the replica configuration information includes the one or more primary replicas stored by the first node in the raft replica group and the one or more secondary replicas stored by the at least one second node in the raft replica group; and for the node to be processed corresponding to the raft replica group, determining whether the replica configuration information corresponding to the node to be processed includes the replica to be cleaned corresponding to the node to be processed, if yes, reserving the replica to be cleaned corresponding to the node to be processed, and if no, deleting the replica to be cleaned corresponding to the node to be processed.

In some embodiments, for the node to be processed corresponding to the raft replica group, determining the replica to be cleaned corresponding to the node to be processed, includes: for the node to be processed corresponding to the raft replica group, sending a first request for acquiring a first replica list of the node to be processed to a master; for the node to be processed corresponding to the raft replica group, receiving the first replica list sent back by the master in response to the first request; and for the node to be processed corresponding to the raft replica group, determining the replica to be cleaned corresponding to the node to be processed based on replicas in a second replica list stored in the node to be processed and replicas in the first replica list, in which the replica to be cleaned corresponding to the node to be processed is a replica that is not included in the first replica list but in the second replica list.

In some embodiments, for the node to be processed corresponding to the raft replica group, obtaining the replica configuration information of the raft replica group corresponding to the node to be processed, includes: for the node to be processed corresponding to the raft replica group, according to the determined replica to be cleaned corresponding to the node to be processed, sending a second request for acquiring replica configuration information to the first node in the raft replica group, such that the first node in the raft replica group sends back the replica configuration information in response to the second request.

In some embodiments, the second request includes an empty log, and for the node to be processed corresponding to the raft replica group, the first node in the raft replica group sends back the replica configuration information in response to the second request by: the first node in the raft replica group sending the empty log to at least one second node in the raft replica group; and when the first node in the raft replica group receives at least preset number of synchronization empty log confirmation messages, the first node in the raft replica group sending back the replica configuration information, in which the preset number is greater than or equal to half of a total number of the first node and the second nodes in the raft replica group.

In a second aspect, embodiments of the present disclosure provide a replica processing node. The replica processing node includes: a determining module, configured to, for a node to be processed corresponding to a raft replica group, determine a replica to be cleaned corresponding to the node to be processed, in which the raft replica group includes a first node configured to store one or more primary replicas and at least one second node configured to store one or more secondary replicas; an obtaining module, configured to, for the node to be processed corresponding to the raft replica group, obtain replica configuration information of the raft replica group corresponding to the node to be processed, in which the replica configuration information includes the one or more primary replicas stored by the first node in the raft replica group and the one or more secondary replicas stored by the at least one second node in the raft replica group; a judging module, configured to, for the node to be processed corresponding to the raft replica group, determine whether the replica configuration information corresponding to the node to be processed includes the replica to be cleaned corresponding to the node to be processed; and a cleaning module, configured to, for the node to be processed corresponding to the raft replica group, when the judging module determines that the replica configuration information corresponding to the node to be processed includes the replica to be cleaned corresponding to the node to be processed, reserve the replica to be cleaned corresponding to the node to be processed; and for the node to be processed corresponding to the raft replica group, when the judging module determines that the replica configuration information corresponding to the node to be processed does not include the replica to be cleaned corresponding to the node to be processed, delete the replica to be cleaned corresponding to the node to be processed.

In some embodiments, the determining module is configured to, for the node to be processed corresponding to the raft replica group, send a first request for acquiring a first replica list of the node to be processed to a master; for the node to be processed corresponding to the raft replica group, receive the first replica list sent back by the master in response to the first request; and for the node to be processed corresponding to the raft replica group, determine the replica to be cleaned corresponding to the node to be processed based on replicas in a second replica list stored in the node to be processed and replicas in the first replica list, in which the replica to be cleaned corresponding to the node to be processed is a replica that is not included in the first replica list but in the second replica list.

In some embodiments, the obtaining module is configured to, for the node to be processed corresponding to the raft replica group, according to the determined replica to be cleaned corresponding to the node to be processed, send a second request for acquiring replica configuration information to the first node in the raft replica group, such that the first node in the raft replica group sends back the replica configuration information in response to the second request.

In some embodiments, the second request includes an empty log, and for the node to be processed corresponding to the raft replica group, the first node in the raft replica group sends back the replica configuration information in response to the second request by: the first node in the raft replica group sending the empty log to at least one second node in the raft replica group; and when the first node in the raft replica group receives at least preset number of synchronization empty log confirmation messages, the first node in the raft replica group sending back the replica configuration information to the obtaining module, in which the preset number is greater than or equal to half of a total number of the first node and the second nodes in the raft replica group.

In a third aspect, embodiments of the present disclosure provide a distributed storage system comprising a master, at least one raft replica group, and a replica processing node, in which each raft replica group includes a first node configured to store one or more primary replicas and at least one second node configured to store one or more secondary replicas; and for a node to be processed corresponding to a raft replica group, after a garbage cleanup is triggered, the replica processing node is configured to: determine a replica to be cleaned corresponding to the node to be processed; obtain replica configuration information of the raft replica group corresponding to the node to be processed, in which the replica configuration information includes the one or more primary replicas stored by the first node in the raft replica group and the one or more secondary replicas stored by the at least one second node in the raft replica group; and determine whether the replica configuration information corresponding to the node to be processed includes the replica to be cleaned corresponding to the node to be processed, if yes, reserve the replica to be cleaned corresponding to the node to be processed, and if no, delete the replica to be cleaned corresponding to the node to be processed.

In some embodiments, the replica processing node is configured to send a first request for acquiring a first replica list of the node to be processed to a master, receive the first replica list sent back by the master in response to the first request, and determine the replica to be cleaned corresponding to the node to be processed according to replicas in a second replica list stored in the node to be processed and replicas in the first replica list, in which the replica to be cleaned corresponding to the node to be processed is a replica that is not included in the first replica list but in the second replica list.

In some embodiments, the replica processing node is configured to send a second request for acquiring replica configuration information to the first node in the raft replica group corresponding to the node to be processed according to the replica to be cleaned corresponding to the node to be processed, and the first node in the raft replica group corresponding to the node to be processed is configured to send back the replica configuration information to the replica processing node in response to the second request.

In some embodiments, the second request includes an empty log, and the first node in the raft replica group corresponding to the node to be processed is configured to: send the empty log to at least one second node in the raft replica group; and when at least preset number of synchronization empty log confirmation messages are received, send back the replica configuration information to the replica processing node, in which the preset number is greater than or equal to half of a total number of the first node and the second nodes in the raft replica group.

In some embodiments, the distributed storage system is a distributed storage system based on a distributed consensus Raft protocol.

In some embodiments, for the node to be processed corresponding to the raft replica group, the replica processing node is the node to be processed.

In a fourth aspect, embodiments of the present disclosure provide a server, the server includes: one or more processors; a storage device on which one or more programs are stored. When the one or more programs are executed by the one or more processors, the one or more processors are caused to implement the replica processing method as described above.

In a fifth aspect, embodiments of the present disclosure provide a computer-readable medium having a computer program stored thereon, in which when the program is executed, the replica processing method as described above is implemented.

With the replica processing method based on the raft protocol, the replica processing node, the distributed storage system, the server, and the computer readable medium according to embodiments of the present disclosure, the replica to be cleaned (garbage) is wiped out under the premise of ensuring the data security of the raft replica group, to effectively avoid accidental deletion of replicas due to blind trust on the master, thereby effectively preventing the unavailability of the raft replica group and data loss.

BRIEF DESCRIPTION OF THE DRAWINGS

The drawings are used to provide a further understanding of the embodiments of the present disclosure, and constitute a portion of the specification. The specific embodiments described herein are only used to explain the present disclosure together with the drawings rather than to limit the present disclosure. The above and/or additional aspects and advantages of embodiments of the present disclosure will become apparent and more readily appreciated from the following descriptions made with reference to the drawings, in which:

FIG. 2 is a flowchart of a specific implementation of step 11 according to an embodiment of the present disclosure.

FIG. 3 is a flowchart of a specific implementation of step 12 according to an embodiment of the present disclosure.

DETAILED DESCRIPTION

Figure 1:
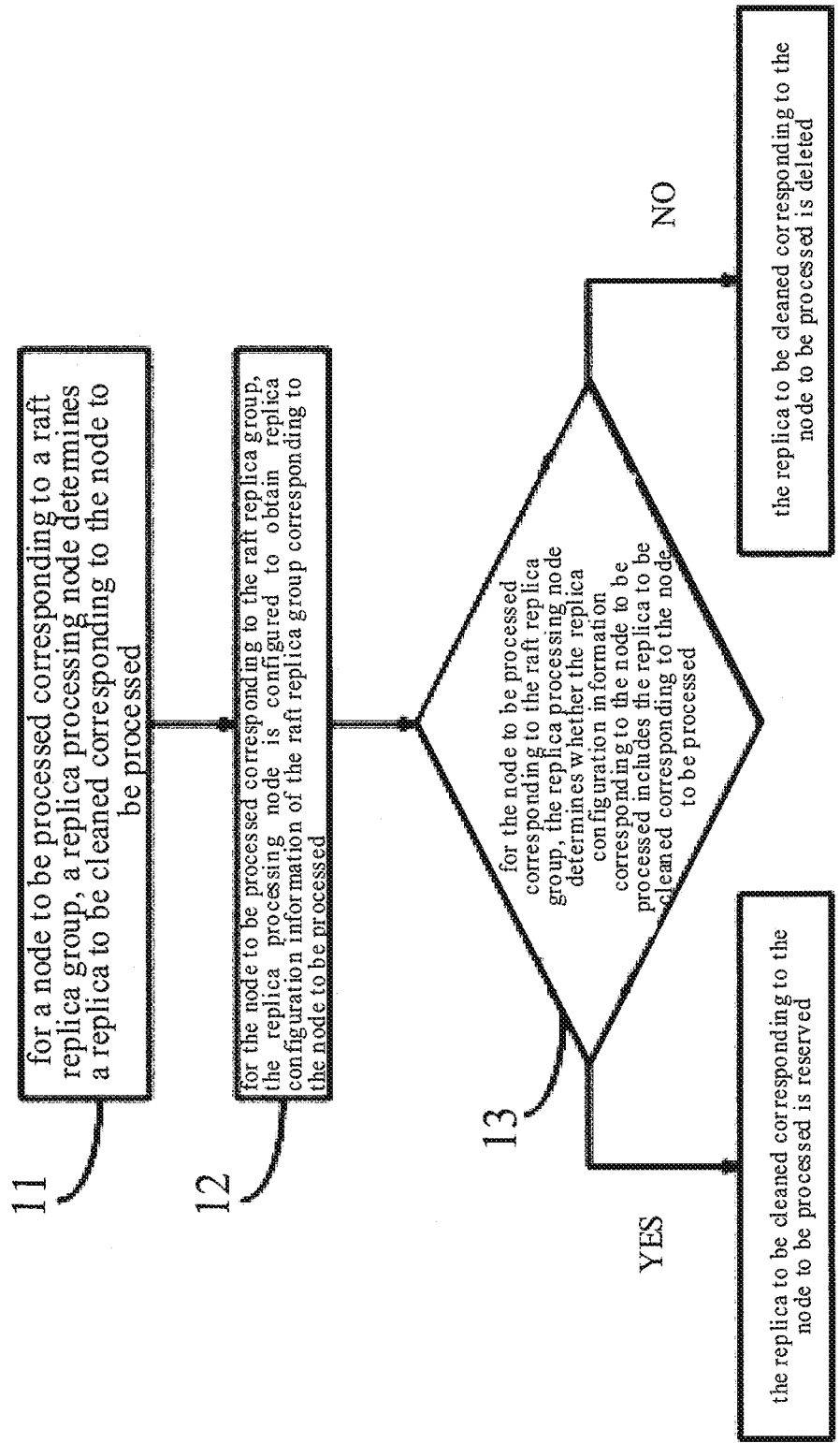
FIG. 1 is a flowchart of a replica processing method based on a Raft protocol according to an embodiment of the present disclosure.

In order to enable those skilled in the art to better understand the technical solution of the present disclosure, a replica processing method based on a Raft protocol and a replica processing node, a distributed storage system, a server, and a computer-readable medium according to the present disclosure are detailed below with reference to the accompanying drawings.

Example embodiments are described more fully hereinafter with reference to the accompanying drawings, but the example embodiments may be embodied in different forms and should not be construed as limited to the embodiments set forth herein. Rather, these embodiments are provided so that this disclosure is thorough and complete, and enables those skilled in the art to fully understand the scope of this disclosure.

As used herein, the term "and/or" includes any and all combinations of one or more of the associated listed items.

The terminology used herein is used only to describe a particular embodiment and is not intended to limit the present disclosure. As used herein, the singular forms "a" and "the" are intended to include the plural forms as well, unless the context clearly indicates otherwise. It is understood that when the terms "comprising" and/or "made of" are used in this specification, the presence of stated features, wholes, steps, operations, elements and/or components is specified, but the existence or addition of one or more additional features, wholes, steps, operations, elements, components, and/or groups thereof is not ruled out.

Embodiments described herein may be described with reference to a plan view and/or a cross-sectional view with the aid of an ideal schematic diagram of the present disclosure. Accordingly, the example diagrams may be modified according to manufacturing techniques and/or tolerances. Therefore, the embodiment is not limited to the embodiment shown in the drawings, but includes configuration modifications formed based on a manufacturing process. Therefore, the regions illustrated in the drawings have schematic attributes, and the shapes of the regions illustrated in the drawings illustrate the specific shapes of the regions of the elements, but are not intended to be limiting.

Unless otherwise defined, all terms (including technical and scientific terms) used herein have the same meaning as commonly understood by those skilled in the art. It is understood that terms such as those defined in commonly used dictionaries should be interpreted to have meanings consistent with their meanings in the context of the related technology and the present disclosure, and are not to be interpreted as having idealized or excessive formal meanings, unless it is explicitly defined herein.

FIG. 1 is a flowchart of a replica processing method based on a Raft protocol according to an embodiment of the present disclosure. As illustrated in FIG. 1, the replica processing method includes the followings.

At step 11, for each raft replica group, with regard to a node to be processed corresponding to the raft replica group, a replica processing node determines a replica to be cleaned corresponding to the node to be processed, in which the raft replica group includes a first node configured to store one or more primary replicas and at least one second node configured to store one or more secondary replicas.

In a distributed storage system based on a distributed consensus protocol, that is, a Raft protocol, the distributed storage system generally includes at least one raft replica group, and each raft replica group includes a primary process for accessing a primary replica of data and at least one secondary process for accessing a secondary replica of the data in order to back up the data. The primary process is called leader, and the secondary process is called follower. In some embodiments, the primary process is called a first node, and the secondary process is called a second node. In the embodiment of the present disclosure, the first node and the second node may also be collectively referred to as data storage nodes (BlockServers).

In some embodiments, for each second node in each raft replica group, according to a storage policy, after the second node is kicked out of the raft replica group by a metadata server (master), the second node becomes a node to be processed.

In some embodiments, at step 11, for a node to be processed corresponding to each a raft replica group, the replica processing node determines the replica to be cleaned corresponding to the node to be processed. In some embodiments, for the node to be processed corresponding to the raft replica group, the replica processing node is the node to be processed, that is, the second node that has been kicked out of the raft replica group according to the storage policy. In some embodiments, the replica processing node may also be an apparatus, a device, a server, or a system for processing the replica to be cleaned on corresponding to the node to be processed of corresponding to the raft replica group.

In some embodiments, for the node to be processed corresponding to the raft replica group, when the replica processing node is the node to be processed, after a garbage cleanup is triggered, for the node to be processed corresponding to the raft replica group, at step 11, the node to be processed (the replica processing node) first determines the replica to be cleaned on the node to be processed (the replica processing node), and then executes subsequent steps for processing the replica to be cleaned on the node to be processed (the replica processing node).

In some embodiments, for the node to be processed corresponding to the raft replica group, when the replica processing node is an apparatus, a device, a server, or a system for processing the replica to be cleaned on the node to be processed corresponding to the raft replica group, after the garbage cleanup is triggered, for the node to be processed corresponding to the raft replica group, the replica processing node first determines the replica to be cleaned on the node to be processed, and then executes subsequent steps for processing the replica to be cleaned on the node to be processed.

FIG. 2 is a flowchart of a specific implementation of step 11 according to an embodiment of the present disclosure. In some embodiments, as illustrated in FIG. 2, step 11 includes the steps 11A-11C.

At step 11A, for each raft replica group, with regard to a node to be processed corresponding to the raft replica group, the replica processing node is configured to send a request for acquiring a first replica list of the node to be processed to the master.

In a distributed storage system, the distributed storage system further includes the master configured to store all metadata of the distributed storage system, including all replica metadata (a replica list) of each first node and all replica metadata (a replica list) of each second node in each raft replica group. For each second node in each raft replica group, according to the storage policy, the second node is kicked out of the raft replica group by the master and becomes a node to be processed. The master still stores the replica list (a first replica list) of the second node (the node to be processed).

In some embodiments, at step 11A, for the node to be processed corresponding to the raft replica group, the replica processing node is configured to send the request for acquiring the first replica list of the node to be processed to the master.

In some embodiments, for the node to be processed corresponding to the raft replica group, the replica processing node is the node to be processed. After the garbage cleanup is triggered, for the node to be processed corresponding to the raft replica group, at step 11A, the node to be processed (the replica processing node) inquiries the master about the first replica list of the node, and the first replica list is a replica list of the node to be processed (the replica processing node) stored on the master.

In some embodiments, for the node to be processed corresponding to the raft replica group, the replica processing node is an apparatus, a device, a server, or a system for processing the replica to be cleaned on the node to be processed corresponding to the raft replica group. After the garbage cleanup is triggered, for the node to be processed corresponding to the raft replica group, at step 11A, the replica processing node inquiries the master about the first replica list of the node to be processed, and the first replica list is a replica list of the node to be processed stored on the master.

At step 11B, for the node to be processed corresponding to the raft replica group, the replica processing node is configured to receive the first replica list sent back by the master according to the request for acquiring the first replica list of the node to be processed.

In some embodiments, at step 11B, for the node to be processed corresponding to the raft replica group, the replica processing node is configured to receive the first replica list sent back by the master according to the request for acquiring the first replica list of the node to be processed. In some embodiments, the first replica list includes at least one replica. In some embodiments, the number of replicas in the first replica list is zero. The number of replicas in the first replica list depends on the actual situation, which is not limited in the embodiment of the present disclosure.

In some embodiments, for the node to be processed corresponding to the raft replica group, the replica processing node is the node to be processed. After the garbage cleanup is triggered, for the node to be processed corresponding to the raft replica group, at step 11B, the node to be processed (the replica processing node) receives the first replica list sent back by the master according to the request for acquiring the first replica list of the node to be processed.

In some embodiments, the replica processing node is an apparatus, a device, a server, or a system for processing the replica to be cleaned on the node to be processed corresponding to the raft replica group. After the garbage cleanup is triggered, for the node to be processed corresponding to the raft replica group, at step 11B, the replica processing node receives the first replica list sent back by the master according to the request for acquiring the first replica list of the node to be processed.

At step 11C, for the node to be processed corresponding to the raft replica group, the replica to be cleaned corresponding to the node to be processed is determined according to the replicas in a second replica list stored in the node to be processed and the replicas in the acquired first replica list.

In some embodiments, at step 11C, for the node to be processed corresponding to the raft replica group, the replica processing node determines the replica to be cleaned corresponding to the node to be processed according to the replicas in a second replica list stored in the node to be processed and the replicas in the first replica list. The replica to be cleaned corresponding to the node to be processed is a replica that is not included in the first replica list but in the second replica list.

In some embodiments, for the node to be processed corresponding to the raft replica group, the replica processing node is the node to be processed. After the garbage cleanup is triggered, for the node to be processed corresponding to the raft replica group, at step 11C, the node to be processed (the replica processing node) determines the replica to be cleaned on the node to be processed (the replica processing node) based on the replicas in the pre-stored second replica list and the replicas in the first replica list acquired from the master. In other words, the node to be processed (the replica processing node) compares the replicas in the second replica list stored by itself with the replicas in the acquired first replica list of the node to be processed (the replica processing node) that is stored on the master, to determine a replica that is included in the second replica list but not in the first replica list, and determines the replica that is in the second replica list but not in the first replica list as the replica to be cleaned.

In some embodiments, the replica processing node is an apparatus, a device, a server, or a system for processing the replica to be cleaned on the node to be processed corresponding to the raft replica group. After the garbage cleanup is triggered, for the node to be processed corresponding to the raft replica group, at step 11C, after obtaining the first replica list of the node to be processed that is stored on the master, the replica processing node further acquires the second replica list stored on the node to be processed, and then determines the replica to be cleaned based on the replicas in the second replica list stored on the node to be processed and the replicas in the first replica list of the node to be processed that is stored on the master.

For example, the first replica list is {S2, S3, . . . , Sn}, where Sn represents a replica, and the second replica list is {S1, S2, S3, . . . , Sn}. By comparison, S1 is included in the second replica list and not in the first replica list, that is, S1 is the replica to be cleaned.

At step 12, for each raft replica group, with regard to the node to be processed corresponding to the raft replica group, the replica processing node is configured to obtain replica configuration information of the raft replica group corresponding to the node to be processed.

In some embodiments, at step 12, for the node to be processed corresponding to the raft replica group, the replica processing node is configured to obtain replica configuration information of the raft replica group corresponding to the node to be processed. The replica configuration information includes one or more primary replicas stored by the first node of the raft replica group and one or more secondary replicas stored by the at least one second node of the raft replica group. It should be noted that, in the embodiments of the present disclosure, for each raft replica group, the first node and each second node in the raft replica group store the replica configuration information of the raft replica group.

In some embodiments, for the node to be processed corresponding to the raft replica group, the replica processing node is the node to be processed. After the garbage cleanup is triggered, for the node to be processed corresponding to the raft replica group, at step 12, the node to be processed (the replica processing node) obtains the replica configuration information of the raft replica group corresponding to the node to be processed (the replica processing node).

In some embodiments, the replica processing node is an apparatus, a device, a server, or a system for processing the replica to be cleaned on the node to be processed corresponding to the raft replica group. After the garbage cleanup is triggered, for the node to be processed corresponding to the raft replica group, at step 12, the replica processing node obtains the replica configuration information of the raft replica group corresponding to the node to be processed.

FIG. 3 is a flowchart of a specific implementation of step 12 according to an embodiment of the present disclosure. In some embodiments, as illustrated in FIG. 3, step 12 includes the following steps.

At step 12A, for each raft replica group, with regard to a node to be processed corresponding to the raft replica group, the replica processing node sends a request for acquiring the replica configuration information to the first node in the raft replica group, according to the determined replica to be cleaned corresponding to the node to be processed.

At step 12B, for the node to be processed corresponding to the raft replica group, the replica processing node receives the replica configuration information sent back by the first node in the raft replica group corresponding to the node to be processed according to the request for acquiring the replica configuration information.

In some embodiments, for the node to be processed corresponding to the raft replica group, the replica processing node is the node to be processed. After the garbage cleanup is triggered, for the node to be processed corresponding to the raft replica group, at step 12A, the node to be processed (the replica processing node) sends the request for acquiring the replica configuration information to the first node in the raft replica group, according to the determined replica to be cleaned. At step 12B, the node to be processed (the replica processing node) receives the replica configuration information sent back by the first node in the raft replica group corresponding to the node to be processed according to the request for acquiring the replica configuration information.

In some embodiments, the replica processing node is an apparatus, a device, a server, or a system for processing the replica to be cleaned on the node to be processed corresponding to the raft replica group. After the garbage cleanup is triggered, for the node to be processed corresponding to the raft replica group, at step 12A, the replica processing node sends the request for acquiring the replica configuration information to the first node in the raft replica group corresponding to the node to be processed, according to the determined replica to be cleaned on the node to be processed. At step 12B, the replica processing node receives the replica configuration information sent back by the first node in the raft replica group corresponding to the node to be processed according to the request for acquiring the replica configuration information.

In some embodiments, the request for acquiring the replica configuration information includes an empty log. Further, steps 12A1 to 12A3 are preformed prior to step 12B, that is, for the node to be processed corresponding to the raft replica group, the first node in the raft replica group corresponding to the node to be processed sends back the replica configuration information according to the request for acquiring the replica configuration information as follows.

At step 12A1, the first node in the raft replica group sends the empty log to at least one second node in the raft replica group.

At step 12A1, for the node to be processed corresponding to the raft replica group, after the first node in the raft replica group corresponding to the node to be processed receives the request for acquiring the replica configuration information sent by the replica processing node, the first node in the raft replica group synchronously sends the empty log contained in the request to at least one second node in the raft replica group. The empty log is a raft empty log.

At step 12A2, when the first node in the raft replica group receives at least preset number of synchronization empty log confirmation message, the first node in the raft replica group sends back the replica configuration information to the replica processing node.

At step 12A2, for the node to be processed corresponding to the raft replica group, after at least one second node in the raft replica group receives the empty log, the second node that receives the empty log may return a synchronization empty log confirmation message to the first node in the raft replica group. When the first node in the raft replica group receives at least preset number of synchronization empty log confirmation messages that are returned by the second nodes, it indicates that most of the second nodes accepted the empty log, which further indicates that the raft replica group is normal, so that the first node in the raft replica group may return the replica configuration information of the raft replica group to the replica processing node.

For the node to be processed corresponding to the raft replica group, by writing an empty log to the first node in the raft replica group, the first node in the raft replica group synchronizes the empty log to respective second nodes in the raft replica group. When it is determined that the number of the first node and the second nodes in the raft replica group that can be filed with the empty log is greater than or equal to a preset number, it indicates that the raft replica group is normal, that is, whether the raft replica group is normal is detected by writing an empty log. Therefore, after receiving the majority (at least preset number) of empty log confirmation messages from the second nodes in the raft replica group, the first node in the raft replica group returns the replica configuration information to the replica processing node.

At step 12A2, for each raft replica group, the preset number is greater than or equal to half of the total number of the first node and the second nodes in the raft replica group. It is not difficult to understand that the aforementioned "at least preset number" refers to a number greater than or equal to the preset number.

It should be noted that, for each raft replica group, after the first node in the raft replica group receives the empty log, the first node itself generates the empty log, and after each second node in the raft replica group receives the empty log, each second node in the raft replica group also generates a synchronization empty log confirmation message. When the first node of the raft replica group receives at least preset number of synchronization empty log confirmation messages (when the first node has generated the synchronization empty log confirmation message, the at least preset number of synchronization empty log confirmation messages include the synchronization empty log confirmation message generated by the first node), and the first node returns the replica configuration information to the replica processing node.

At step 13, for each raft replica group, with regard to the node to be processed corresponding to the raft replica group, the replica processing node determines whether the replica configuration information corresponding to the node to be processed includes the replica to be cleaned corresponding to the node to be processed, and if yes, the replica to be cleaned corresponding to the node to be processed is reserved, and if not, the replica to be cleaned corresponding to the node to be processed is deleted.

In some embodiments, for the node to be processed corresponding to the raft replica group, the replica processing node is the node to be processed. After the garbage cleanup is triggered, for the node to be processed corresponding to the raft replica group, at step 13, the node to be processed (the replica processing node) determines whether the replica configuration information of the raft replica group corresponding to the node to be processed (the replica processing node) includes the replica to be cleaned on the node to be processed (the replica processing node), and if yes, the node to be processed (the replica processing node) reserves the replica to be cleaned on the node to be processed (the replica processing node), otherwise the replica to be cleaned on the node to be processed (the replica processing node) is deleted.

In some embodiments, the replica processing node is an apparatus, a device, a server, or a system for processing the replica to be cleaned on the node to be processed corresponding to the raft replica group. After the garbage cleanup is triggered, for the node to be processed corresponding to the raft replica group, at step 13, the replica processing node determines whether the replica configuration information of the raft replica group corresponding to the node to be processed includes the replica to be cleaned on the node to be processed, and if yes, the replica to be cleaned on the node to be processed is reserved by the replica processing node, and if not, the replica to be cleaned on the node to be processed is deleted.

Figure 4:
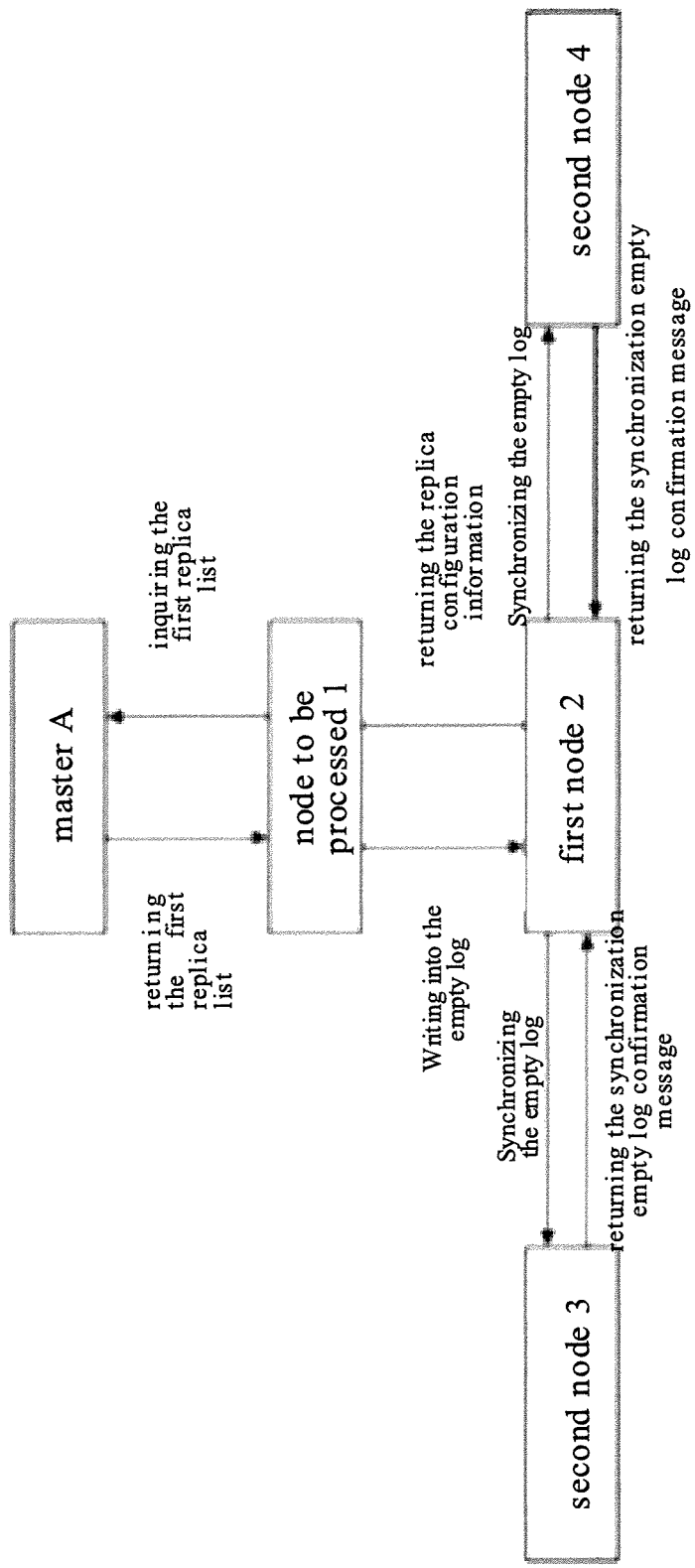
FIG. 4 is a schematic diagram of an application of a replica processing method according to an embodiment of the present disclosure.

FIG. 4 is a schematic diagram of an application of a replica processing method according to an embodiment of the present disclosure. FIG. 4 illustrates a case where a distributed storage system based on the Raft protocol includes one raft replica group. As illustrated in FIG. 4, the distributed storage system includes a master A, a raft replica group B, and a replica processing node, where the raft replica group B includes a first node 2, a second node 1, a second node 3, and a second node 4. The replica located on the second node 1 is kicked out of the raft replica group B according to a storage policy, and the second node 1 becomes the node 1 to be processed. FIG. 4 illustrates a case where the replica processing node is the node 1 to be processed corresponding to the raft replica group B. Taking the replica processing node as the node 1 to be processed corresponding to the raft replica group B as an example, after the garbage cleanup is triggered, the node 1 to be processed first inquiries the master A about a first replica list of the node (the node 1 to be processed) stored on the master A. After receiving the first replica list, the node 1 to be processed compares the replicas in the second replica list stored by itself with the replicas in the first replica list to determine the replica to be cleaned on the node (the node 1 to be processed). An empty log is written to the first node 2 of the corresponding raft replica group B. The first node 2 synchronously sends the empty log to the second node 3 and the second node 4. The second node 3 returns the synchronization empty log confirmation message to the first node 2, and the second node 4 returns the synchronization empty log confirmation message to the first node 2. The first node 2 returns the replica configuration information of the raft replica group B to the node 1 to be processed. The node 1 to be processed determines whether the replica configuration information includes the replica to be cleaned, and if it does, the replica to be cleaned is reserved, otherwise the replica to be cleaned is deleted.

In the replica processing method according to the embodiments of the present disclosure, after determining the replica to be cleaned on the node to be processed corresponding to a raft replica group in a distributed storage system, the replica to be cleaned is not deleted immediately, and the replica configuration information of the raft replica group corresponding to the node to be processed is obtained to determine whether the replica configuration information includes the replica to be cleaned. If yes, it indicates that deleting the replica to be cleaned will destroy the data security of the raft replica group, so the replica to be cleaned on the node to be processed is reserved, if not, it indicates that the replica to be cleaned on the node to be processed can be safely deleted, so the replica to be cleaned on the node to be processed is deleted.

With the replica processing method according to the disclosed embodiments, the replica to be cleaned (garbage) is wiped out on the premise of ensuring the data security of the raft replica group, to effectively avoid accidental deletion of replicas due to blind trust on the master, thereby effectively preventing the unavailability of the raft replica group and data loss.

Figure 5:
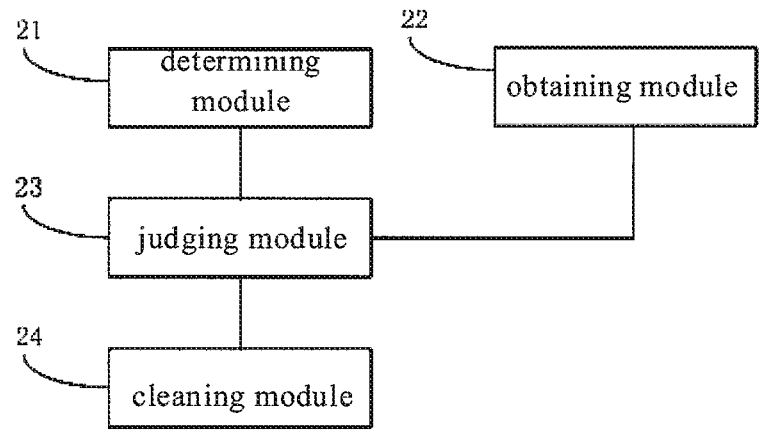
FIG. 5 is a block diagram of a replica processing node according to an embodiment of the present disclosure.

FIG. 5 is a block diagram of a replica processing node according to an embodiment of the present disclosure. As illustrated in FIG. 5, the replica processing node is configured to implement the above-mentioned replica processing method. The replica processing node includes: a determining module 21, an obtaining module 22, a judging module 23, and a cleaning module 24.

The determining module 21 is configured to, for each raft replica group, with regard to a node to be processed corresponding to the raft replica group, determine a replica to be cleaned corresponding to the node to be processed. The raft replica group comprises a first node configured to store one or more primary replicas and at least one second node configured to store one or more secondary replicas.

The obtaining module 22 is configured to, for each raft replica group, with regard to a node to be processed corresponding to the raft replica group, obtain replica configuration information of the raft replica group corresponding to the node to be processed. The replica configuration information comprises one or more primary replicas stored by the first node in the raft replica group and one or more secondary replicas stored by the at least one second node in the raft replica group.

The judging module 23 is configured to, for each raft replica group, with regard to a node to be processed corresponding to the raft replica group, determine whether the replica configuration information corresponding to the node to be processed comprises the replica to be cleaned corresponding to the node to be processed.

The cleaning module 24 is configured to, for each raft replica group, with regard to a node to be processed corresponding to the raft replica group, when the judging module 23 determines that the replica configuration information corresponding to the node to be processed comprises the replica to be cleaned corresponding to the node to be processed, reserve the replica to be cleaned corresponding to the node to be processed; and for each raft replica group, with regard to a node to be processed corresponding to the raft replica group, when the judging module 23 determines that the replica configuration information corresponding to the node to be processed does not comprise the replica to be cleaned corresponding to the node to be processed, delete the replica to be cleaned corresponding to the node to be processed.

In some embodiments, the determining module 21 is configured to, for the node to be processed corresponding to the raft replica group, send a first request for requiring a first replica list of the node to be processed to a master; for the node to be processed corresponding to the raft replica group, receive the first replica list sent back by the master based on the first request; and for the node to be processed corresponding to the raft replica group, determine the replica to be cleaned corresponding to the node to be processed according to replicas in a second replica list stored in the node to be processed and replicas in the first replica list, in which the replica to be cleaned corresponding to the node to be processed is a replica that is not included in the first replica list but in the second replica list.

In some embodiments, the obtaining module 22 is configured to, for the node to be processed corresponding to the raft replica group, according to the determined replica to be cleaned corresponding to the node to be processed, send a second request for acquiring replica configuration information to the first node in the raft replica group, such that the first node in the raft replica group sends back the replica configuration information according to the second request.

In some embodiments, the second request includes an empty log, and for each second node corresponding to the raft replica group, the first node in the raft replica group sends back the replica configuration information according to the second request by: the first node in the raft replica group sending the empty log to at least one second node in the raft replica group; and when the first node in the raft replica group receives at least preset number of synchronization empty log confirmation messages, the first node in the raft replica group sending back the replica configuration information to the obtaining module 22.

In some embodiments, for each second node in the raft replica group, according to a storage policy, the second node is kicked out of the raft replica group and becomes the node to be processed.

In some embodiments, for the node to be processed corresponding to the raft replica group, the replica processing node is the node to be processed. In some embodiments, the replica processing node is an apparatus, a device, a server, or a system for processing the replica to be cleaned on the node to be processed corresponding to the raft replica group.

In addition, the replica processing node provided in the embodiments of the present disclosure is specifically configured to implement the foregoing replica processing method. For details, reference can be made to the description of the foregoing replica processing method, and details are not described herein again.

Figure 6:
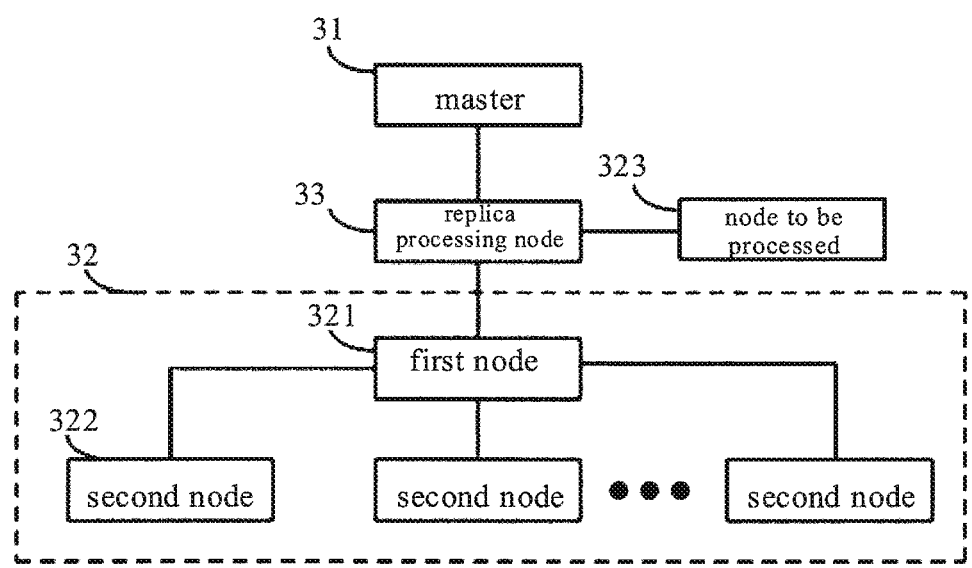
FIG. 6 is a schematic diagram of a distributed storage system according to an embodiment of the present disclosure.

FIG. 6 is a schematic diagram of a distributed storage system according to an embodiment of the present disclosure. As illustrated in FIG. 6, the distributed storage system is configured to implement the foregoing replica processing method. The distributed storage system includes a master 31, at least one raft replica group 32, a node to be processed 323, and a replica processing node 33. Each raft replica group 32 includes a first node 321 for storing one or more primary replicas and at least one second node 322 for storing one or more secondary replicas.

For a node to be processed 323 corresponding to a raft replica group 32, after the garbage cleanup is triggered, the replica processing node 33 is configured to implement the following steps 41 to 43.

At step 41, a replica to be cleaned corresponding to the node to be processed is determined.

At step 42, replica configuration information of the raft replica group corresponding to the node to be processed is obtained, in which the replica configuration information includes one or more primary replicas stored by the first node in the raft replica group and one or more secondary replicas stored by the at least one second node in the raft replica group.

At step 43, it is determined whether the replica configuration information corresponding to the node to be processed includes the replica to be cleaned corresponding to the node to be processed, if yes, the replica to be cleaned corresponding to the node to be processed is reserved, and if no, the replica to be cleaned corresponding to the node to be processed is deleted.

In some embodiments, the replica processing node 33 is configured to send a request for acquiring a first replica list of the node to be processed 323 to the master 31, receive the first replica list sent back by the master 31 in response to the request for acquiring the first replica list of the node to be processed, and determine the replica to be cleaned corresponding to the node to be processed 323 according to replicas in a second replica list stored in the node to be processed 323 and replicas in the first replica list. The replica to be cleaned corresponding to the node to be processed 323 is a replica that is not included in the first replica list but in the second replica list.

In some embodiments, the replica processing node 33 is configured to send a request for acquiring replica configuration information to the first node 321 in the raft replica group 32 corresponding to the node to be processed 323, according to the replica to be cleaned corresponding to the node to be processed 323, and the first node 321 in the raft replica group 32 corresponding to the node to be processed 323 is configured to send back the replica configuration information to the replica processing node 33 according to the request for acquiring replica configuration information.

In some embodiments, the request for acquiring replica configuration information acquisition includes an empty log, for a node to be processed 323 corresponding to a raft replica group 32, the first node 321 in the raft replica group 32 corresponding to the node to be processed 323 is configured to: send the empty log to at least one second node 322 in the raft replica group 32; and when at least preset number of synchronization empty log confirmation messages are received, send back the replica configuration information to the replica processing node 33.

In some embodiments, the distributed storage system is a distributed storage system based on a distributed consensus protocol (Raft protocol).

Figure 7:
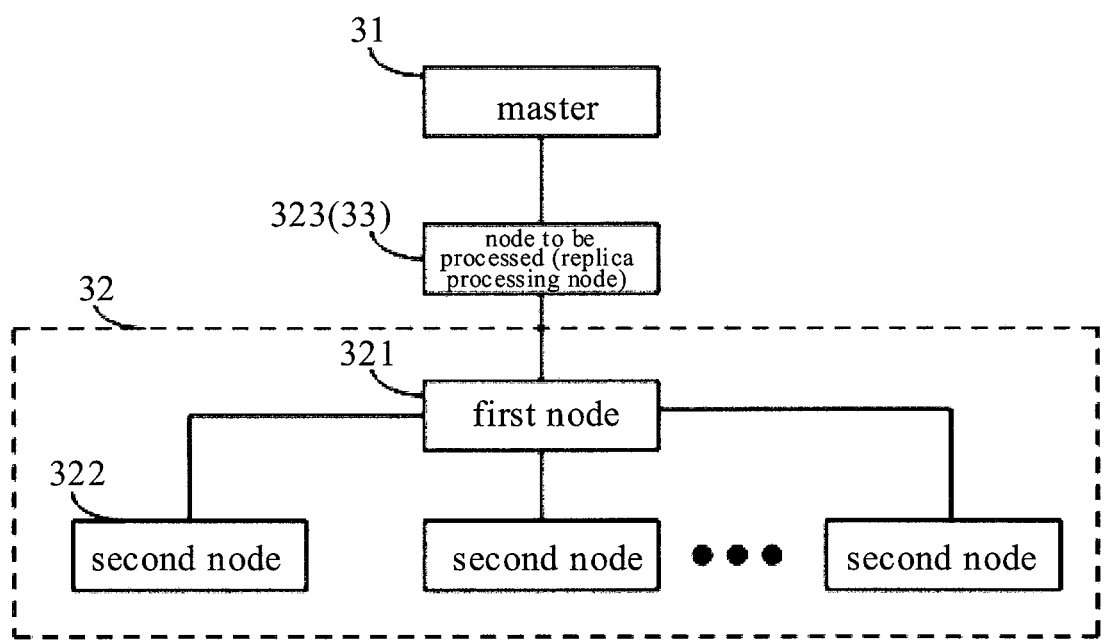
FIG. 7 is a schematic diagram of a distributed storage system according to another embodiment of the present disclosure.

FIG. 7 is a schematic diagram of a distributed storage system according to another embodiment of the present disclosure. In some embodiments, as illustrated in FIG. 7, for a node to be processed 323 corresponding to a raft replica group 32, the replica processing node 33 is the node to be processed 323.

It should be noted that FIG. 6 and FIG. 7 illustrate one raft replica group that includes a plurality of second nodes.

In addition, in the distributed storage system provided by the embodiments of the present disclosure, after the garbage cleanup is triggered, the replica processing node is configured to implement the foregoing replica processing method, which is not described herein again.

Embodiments of the present disclosure provide a server, the server includes: one or more processors; a storage device on which one or more programs are stored. When the one or more programs are executed by the one or more processors, the one or more processors are caused to implement the replica processing method as described above.

Embodiments of the present disclosure provide a computer-readable medium having a computer program stored thereon, in which when the program is executed, the replica processing method as described above is implemented.

Those skilled in the art can understand that all or some steps, systems, and functional modules/units in the methods disclosed above can be implemented as software, firmware, hardware, and appropriate combinations thereof. In a hardware implementation, the division between functional modules/units mentioned in the above description does not necessarily correspond to the division of physical components. For example, one physical component may have multiple functions, or one function or step may be executed cooperatively by several physical components. Some or all physical components can be implemented as software executed by a processor such as a central processing unit, a digital signal processor or a microprocessor, as hardware, or as an integrated circuit, such as a dedicated integrated circuit. Such software may be distributed on computer-readable medias, which may include computer storage media (or non-transitory media) and communication media (or transitory media). As is known to those skilled in the art, the term computer storage medium includes volatile and non-volatile, removable and non-removable media implemented in any method or technology to store information such as computer-readable instructions, data structures, program modules or other data. Computer storage media includes, but is not limited to, RAM, ROM, EEPROM, flash memory or other memory technologies, CD-ROM, digital versatile disk (DVD) or other optical disk storage, magnetic cartridges, magnetic tape, disk storage or other magnetic storage devices, or may any other medium used to store desired information and can be accessed by a computer. In addition, it is well known to those skilled in the art that a communication medium typically includes computer-readable instructions, data structures, program modules, or other data in a modulated data signal such as a carrier wave or other transmission mechanism, and may include any information delivery medium.

Example embodiments have been disclosed herein, and although specific terminologies are employed, they are used only and should only be interpreted as a general illustrative meaning, and not for limiting purposes. In some instances, it is known to those skilled in the art that features, characteristics, and/or elements described in connection with a particular embodiment may be used alone, or in combination with features, characteristics and/or components described in other embodiments, unless explicitly stated otherwise. Therefore, it is understood by those skilled in the art that various changes in form and details may be made without departing from the scope of the present disclosure as set forth in the appended claims.

What is claimed is:

1. A replica processing method based on a raft protocol, comprising:

for a node to be processed corresponding to a raft replica group, determining a replica to be cleaned corresponding to the node to be processed, wherein the raft replica group comprises a first node for storing one or more primary replicas and at least one second node for storing one or more secondary replicas;

for the node to be processed corresponding to the raft replica group, obtaining replica configuration information of the raft replica group corresponding to the node to be processed, wherein the replica configuration information comprises the one or more primary replicas stored by the first node in the raft replica group and the one or more secondary replicas stored by the at least one second node in the raft replica group; and for the node to be processed corresponding to the raft replica group, determining whether the replica configuration information corresponding to the node to be processed comprises the replica to be cleaned corresponding to the node to be processed, reserving the replica to be cleaned corresponding to the node to be processed when the replica configuration information comprises the replica to be cleaned, and deleting the replica to be cleaned corresponding to the node to be processed when the replica configuration information does not comprise the replica to be cleaned.

2. The method according to claim 1, wherein for the node to be processed corresponding to the raft replica group, determining the replica to be cleaned corresponding to the node to be processed, comprises:

for the node to be processed corresponding to the raft replica group, sending a first request for acquiring a first replica list of the node to be processed to a master;

for the node to be processed corresponding to the raft replica group, receiving the first replica list sent back by the master in response to the first request; and for the node to be processed corresponding to the raft replica group, determining the replica to be cleaned corresponding to the node to be processed based on replicas in a second replica list stored in the node to be processed and replicas in the first replica list, wherein the replica to be cleaned corresponding to the node to be processed is a replica that is not included in the first replica list but in the second replica list.

3. The method according to claim 1, wherein for the node to be processed corresponding to the raft replica group, obtaining the replica configuration information of the raft replica group corresponding to the node to be processed, comprises:

for the node to be processed corresponding to the raft replica group, according to the determined replica to be cleaned corresponding to the node to be processed, sending a second request for acquiring replica configuration information to the first node in the raft replica group, such that the first node in the raft replica group sends back the replica configuration information in response to the second request.

4. The method according to claim 3, wherein the second request comprises an empty log, and for the node to be processed corresponding to the raft replica group, the first node in the raft replica group sends back the replica configuration information acquisition in response to the second request by:
the first node in the raft replica group sending the empty log to at least one second node in the raft replica group; and
when the first node in the raft replica group receives at least preset number of synchronization empty log confirmation messages, the first node in the raft replica group sending back the replica configuration information, wherein the preset number is greater than or equal to half of a total number of the first node and the second nodes in the raft replica group.

5. A replica processing node, comprising a non-transitory computer-readable medium comprising computer-executable instructions stored thereon, and an instruction execution system which is configured by the instructions to implement:
a determining module, configured to, for a node to be processed corresponding to a raft replica group, determine a replica to be cleaned corresponding to the node to be processed, wherein the raft replica group comprises a first node configured to store one or more primary replicas and at least one second node configured to store one or more secondary replicas;
an obtaining module, configured to, for the node to be processed corresponding to the raft replica group, obtain replica configuration information of the raft replica group corresponding to the node to be processed, wherein the replica configuration information comprises the one or more primary replicas stored by the first node in the raft replica group and the one or more secondary replicas stored by the at least one second node in the raft replica group; and
a judging module, configured to, for the node to be processed corresponding to the raft replica group, determine whether the replica configuration information corresponding to the node to be processed comprises the replica to be cleaned corresponding to the node to be processed; and
a cleaning module, configured to, for the node to be processed corresponding to the raft replica group, when the judging module determines that the replica configuration information corresponding to the node to be processed comprises the replica to be cleaned corresponding to the node to be processed, reserve the replica to be cleaned corresponding to the node to be processed; and for the node to be processed corresponding to the raft replica group, when the judging module determines that the replica configuration information corresponding to the node to be processed does not comprise the replica to be cleaned corresponding to the node to be processed, delete the replica to be cleaned corresponding to the node to be processed.

6. The replica processing node according to claim 5, wherein the determining module is configured to, for the node to be processed corresponding to the raft replica group, send a first request for acquiring a first replica list of the node to be processed to a master; for the node to be processed corresponding to the raft replica group, receive the first replica list sent back by the master in response to the first request; and for the node to be processed corresponding to the raft replica group, determine the replica to be cleaned corresponding to the node to be processed according to replicas in a second replica list stored in the node to be processed and replicas in the first replica list, wherein the replica to be cleaned corresponding to the node to be processed is a replica that is not included in the first replica list but in the second replica list.

7. The replica processing node according to claim 5, wherein the obtaining module is configured to, for the node to be processed corresponding to the raft replica group, according to the determined replica to be cleaned corresponding to the node to be processed, send a second request for acquiring replica configuration information to the first node in the raft replica group, such that the first node in the raft replica group sends back the replica configuration information in response to the second request.

8. The replica processing node according to claim 7, wherein the second request comprises an empty log, and for the node to be processed corresponding to the raft replica group, the first node in the raft replica group sends back the replica configuration information in response to the second request by:
the first node in the raft replica group sending the empty log to at least one second node in the raft replica group; and
when the first node in the raft replica group receives at least preset number of synchronization empty log confirmation messages, the first node in the raft replica group sending back the replica configuration information to the obtaining module, wherein the preset number is greater than or equal to half of a total number of the first node and the second nodes in the raft replica group.

9. A distributed storage system comprising a master, at least one raft replica group, and a replica processing node, wherein each raft replica group comprises a first node configured to store one or more primary replicas and at least one second node configured to store one or more secondary replicas; and
for a node to be processed corresponding to a raft replica group, after a garbage cleanup is triggered, the replica processing node is configured to:
determine a replica to be cleaned corresponding to the node to be processed;
obtain replica configuration information of the raft replica group corresponding to the node to be processed, wherein the replica configuration information comprises the one or more primary replicas stored by the first node in the raft replica group and the one or more secondary replicas stored by the at least one second node in the raft replica group; and
determine whether the replica configuration information corresponding to the node to be processed comprises the replica to be cleaned corresponding to the node to be processed, if yes, reserve the replica to be cleaned corresponding to the node to be processed, and if no, delete the replica to be cleaned corresponding to the node to be processed.

10. The distributed storage system according to claim 9, wherein the replica processing node is configured to send a first request for acquiring a first replica list of the node to be processed to a master, receive the first replica list sent back by the master in response to the first request, and determine the replica to be cleaned corresponding to the node to be processed based on replicas in a second replica list stored in the node to be processed and replicas in the first replica list, wherein the replica to be cleaned corresponding to the node to be processed is a replica that is not included in the first replica list but in the second replica list.

11. The distributed storage system according to claim 9, wherein the replica processing node is configured to send a second request for acquiring replica configuration information to the first node in the raft replica group corresponding to the node to be processed according to the replica to be cleaned corresponding to the node to be processed, and the first node in the raft replica group corresponding to the node to be processed is configured to send back the replica configuration information to the replica processing node in response to the second request.

12. The distributed storage system according to claim 11, wherein the second request comprises an empty log, and the first node in the raft replica group corresponding to the node to be processed is configured to:
    send the empty log to at least one second node in the raft replica group; and
    when at least preset number of synchronization empty log confirmation messages are received, send back the replica configuration information to the replica processing node, wherein the preset number is greater than or equal to half of a total number of the first node and the second nodes in the raft replica group.

13. The distributed storage system according to claim 9, wherein the distributed storage system is a distributed storage system based on a distributed consensus (Raft) protocol.

14. The distributed storage system according to claim 9, wherein for the node to be processed corresponding to the raft replica group, the replica processing node is the node to be processed.

\* \* \* \* \*